(12) United States Patent
Kamichi et al.

(10) Patent No.: US 6,902,512 B2
(45) Date of Patent: Jun. 7, 2005

(54) POWER OUTPUT APPARATUS AND MOVABLE BODY WITH POWER OUTPUT APPARATUS MOUNTED THEREON

(75) Inventors: Kensuke Kamichi, Toyota (JP); Hidehiro Oba, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/376,255

(22) Filed: Mar. 3, 2003

(65) Prior Publication Data

US 2003/0176256 A1 Sep. 18, 2003

(30) Foreign Application Priority Data

Mar. 18, 2002 (JP) ........................................ 2002-074490

(51) Int. Cl.$^7$ .............................................. B60K 31/00
(52) U.S. Cl. .................... 477/108; 477/42; 477/118; 477/3
(58) Field of Search ............................ 477/3, 5, 15, 17, 477/44, 120, 108, 42, 43, 118; 701/93

(56) References Cited

U.S. PATENT DOCUMENTS

| | | | |
|---|---|---|---|
| 4,905,786 A | * 3/1990 | Miyake et al. | ............... 477/108 |
| 5,813,942 A | * 9/1998 | Nakagawa et al. | .......... 477/120 |
| 6,233,514 B1 | 5/2001 | Claussen et al. | ............... 701/93 |
| 6,306,063 B1 | * 10/2001 | Horgan et al. | ............... 477/108 |
| 6,311,118 B1 | * 10/2001 | Ito et al. | ........................ 477/42 |
| 6,350,216 B1 | 2/2002 | Speicher et al. | ............... 477/37 |
| 6,359,345 B1 | 3/2002 | Suzuki | ...................... 290/40 C |
| 6,364,808 B1 | * 4/2002 | Saur | ............................ 477/42 |
| 6,508,741 B1 | 1/2003 | Murakami et al. | ............. 477/95 |
| 2001/0039230 A1 | * 11/2001 | Severinsky et al. | ............. 477/3 |
| 2001/0046926 A1 | * 11/2001 | Adachi et al. | ............... 477/108 |

FOREIGN PATENT DOCUMENTS

| | | |
|---|---|---|
| EP | 1 057 678 | 12/2000 |
| EP | 1 172 248 | 1/2002 |
| JP | 61-113523 | 5/1986 |
| JP | 01-114547 | 5/1989 |
| JP | 06-144077 | 5/1994 |
| JP | 11-208309 | 3/1999 |
| JP | 2000-352461 | 12/2000 |
| JP | 2001-157305 | 6/2001 |
| JP | 2001-157305 | 8/2001 |

OTHER PUBLICATIONS

Notice of reasons for Rejections (Summary), Mailing Date: Jun. 15, 2004.

* cited by examiner

*Primary Examiner*—Sherry Estremsky
(74) *Attorney, Agent, or Firm*—Kenyon & Kenyon (57) ABSTRACT

The technique of the invention sets a relationship between the throttle opening (corresponding to the accelerator opening), the vehicle speed, and the target torque of a drive shaft, so as to enable a greater braking torque to be output in a working status of a cruise control system than a braking torque, which is output to the drive shaft in a full closed position of the accelerator opening in a non-working status of the cruise control system. This arrangement ensures output of a sufficient braking force to the drive shaft even under the condition of a relatively large drive load applied to the drive shaft, for example, during a downslope run, thus enabling the vehicle speed to be certainly kept at a preset level under the control of the cruise control system.

13 Claims, 5 Drawing Sheets

POWER OUTPUT APPARATUS AND MOVABLE BODY WITH POWER OUTPUT APPARATUS MOUNTED THEREON

BACKGROUND OF THE INVENTION

1. Field of the Invention

The present invention relates to a power output apparatus and a movable body with a power output apparatus mounted thereon.

2. Description of the Prior Art

A type of proposed power output apparatus has a constant speed control system that keeps the revolving speed of a drive shaft at a preset level (for example, JAPANESE PATENT LAID-OPEN GAZETTE No. 1-114547). A cruise control system mounted on an automobile, for example, automatically regulates, in response to a driver's setting of a desired vehicle speed, the throttle opening of an engine without any operation of an accelerator pedal, so as to keep the vehicle speed at a preset level.

In a non-working status of the cruise control system, the driver can operate an accelerator pedal and a brake pedal according to the conditions of a road or another driving path (that is, the loading applied to wheels), for example, a slope, to regulate the vehicle speed to a desired level. The cruise control system in a working status, on the other hand, may not sufficiently handle the situation of a relatively large load applied to an axle, for example, during a drive on a steep slope, and fail to keep the vehicle speed at the preset level. While the vehicle runs on a relatively steep downslope, the vehicle speed may significantly exceed the preset level due to an insufficient braking force output to the axle.

SUMMARY OF THE INVENTION

The object of the present invention is thus to provide a power output apparatus that certainly keeps the revolving speed of a drive shaft at a preset level. The object of the invention is also to certainly keep the travelling speed of a movable body with the power output apparatus mounted thereon at a preset level.

In order to achieve at least a part of the aforementioned objects, the power output apparatus and the movable body with power output apparatus mounted thereon of the present invention are structured as follows.

A power output apparatus of the present invention includes: a power output unit that outputs power to a drive shaft; and a controller that drives and controls the power output unit to make a power according to an accelerator opening output to the drive shaft, sets a wider power output range, in response to setting of a revolving speed, than a possible power output range according to the accelerator opening in the drive control, and drives and controls the power output unit to keep a revolving speed of the drive shaft at the preset revolving speed by output of a power in the preset power output range.

The power output apparatus of the invention sets a wider power output range, in response to setting of a revolving speed, than a possible power output range according to the accelerator opening, and drives and controls the power output unit to keep the revolving speed of the drive shaft at the preset revolving speed by output of a power in the preset power output range. The arrangement of setting the wider power output range in response to setting of the revolving speed than the possible power output range according to the accelerator opening enables a power to be output to the drive shaft corresponding to each of diverse loads applied to the drive shaft. This arrangement enables the revolving speed of the drive shaft to be certainly kept at the preset revolving speed. Here the 'power' includes a negative power, that is, a braking force.

In one preferable application of the power output apparatus of the invention, the controller sets, in response to setting of the revolving speed, a power output range to possibly output a greater braking force than a braking force output to the drive shaft in a full closed position of the accelerator opening. In one embodiment of this application, the power output unit includes an internal combustion engine that functions as a power source, and a transmission, for example, a continuously variable transmission, which changes speed of a power from the internal combustion engine and outputs the speed-changed power to the drive shaft. The controller utilizes a rotational resistance of the internal combustion engine due to regulation of a change gear ratio set in the transmission, so as to enable the greater braking force to be output to the drive shaft. In another embodiment of this application, the power output unit includes a motor that functions as a power source to output a power to the drive shaft and generates electric power in response to input of a power from the drive shaft. The controller utilizes a braking force due to regenerative control of the motor, so as to enable the greater braking force to be output to the drive shaft.

A movable body of the present invention includes: a power output unit that outputs power to a drive shaft; and a controller that drives and controls the power output unit to make a power according to an accelerator opening output to the drive shaft, sets a wider power output range, in response to setting of a travelling speed, than a possible power output range according to the accelerator opening in the drive control, and drives and controls the power output unit to keep a travelling speed of the drive shaft at the preset travelling speed by output of a power in the preset power output range.

The movable body of the invention sets a wider power output range, in response to setting of a travelling speed, than a possible power output range according to the accelerator opening, and drives and controls the power output unit to keep the travelling speed at the preset travelling speed by output of a power in the preset power output range. The arrangement of setting the wider power output range in response to setting of the travelling speed than the possible power output range according to the accelerator opening enables a power to be output to the drive shaft corresponding to each of diverse loads applied to the drive shaft. This arrangement enables the travelling speed to be certainly kept at the preset travelling speed. Here the 'power' includes a negative power, that is, a braking force.

In one preferable application of the movable body of the invention, the controller sets, in response to setting of the travelling speed, a power output range to possibly output a greater braking force than a braking force output to the drive shaft in a full closed position of the accelerator opening. In one embodiment of this application, the power output unit includes an internal combustion engine that functions as a power source, and a transmission, for example, a continuously variable transmission, which changes speed of a power from the internal combustion engine and outputs the speed-changed power to the drive shaft, and the controller utilizes a rotational resistance of the internal combustion engine due to regulation of a change gear ratio set in the transmission, so as to enable the greater braking force to be output to the drive shaft. In another embodiment of this application, the power output unit includes a motor that functions as a power source to output a power to the drive shaft and generates electric power in response to input of a power from the drive shaft, and the controller utilizes a braking force due to regenerative control of the motor, so as to enable the greater braking force to be output to the drive shaft. In still another embodiment, the movable body is a vehicle.

A method of controlling a power output unit of the invention outputs power to a drive shaft, the method driving and controlling the power output unit to make power according to an accelerator opening output to the drive shaft, setting a wider power output range, in response to setting of a revolving speed, than a possible power output range according to the accelerator opening in the drive control, and driving and controlling the power output unit to keep a revolving speed of the drive shaft at the preset revolving speed by output of a power in the preset power output range.

The method of the invention sets a wider power output range, in response to setting of a revolving speed, than a possible power output range according to the accelerator opening, and drives and controls the power output unit to keep the revolving speed of the drive shaft at the preset revolving speed by output of a power in the preset power output range. The arrangement of setting the wider power output range in response to setting of the revolving speed than the possible power output range according to the accelerator opening enables a power to be output to the drive shaft corresponding to each of diverse loads applied to the drive shaft. This arrangement enables the revolving speed of the drive shaft to be certainly kept at the preset revolving speed. Here the 'power' includes a negative power, that is, a braking force.

In one preferable application of the method of the invention, the method sets, in response to setting of the revolving speed, a power output range to possibly output a greater braking force than a braking force output to the drive shaft in a full closed position of the accelerator opening.

DESCRIPTION OF THE PREFERRED EMBODIMENTS

Figure 1:
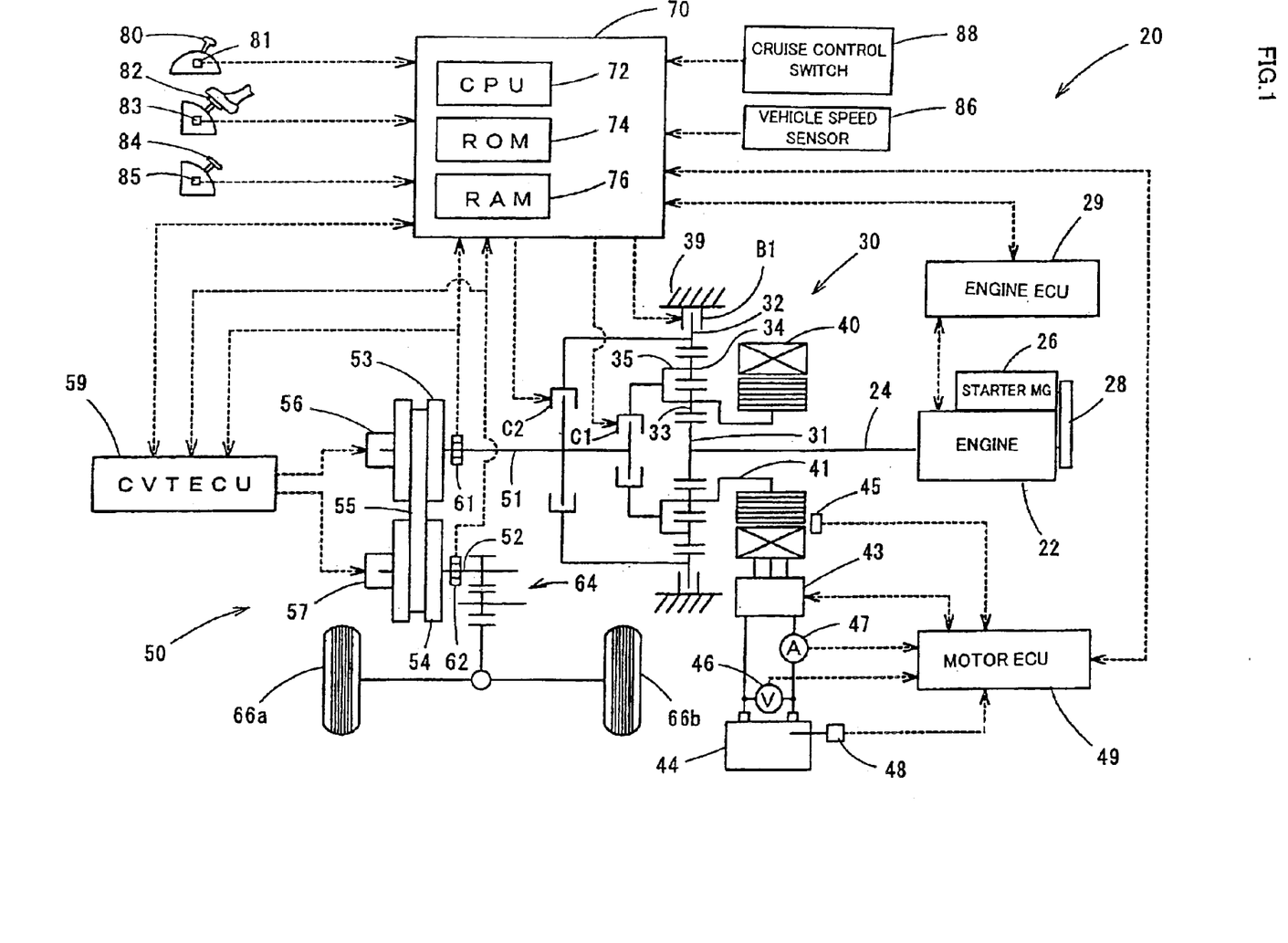
FIG. 1 schematically illustrates the construction of a power output apparatus 20 in one embodiment of the present invention.

One mode of carrying out the invention is discussed below as a preferred embodiment. FIG. 1 schematically illustrates the construction of a power output apparatus 20 in one embodiment of the present invention. The power output apparatus 20 of the embodiment is constructed to output power, for example, to driving wheels of a hybrid vehicle. The power output apparatus 20 includes an engine 22, a planetary gear unit 30 linked with a crankshaft 24 i.e. an output shaft of the engine 22, a motor 40 connected with the planetary gear unit 30 for power generation, a CVT 50 as a continuously variable transmission connected with the planetary gear unit 30 and coupled with driving wheels 66a and 66b via a differential gear 64, and a hybrid electronic control unit (hereafter referred to as hybrid ECU) 70 for controlling the respective constituents of the whole power output apparatus 20.

The engine 22 is an internal combustion engine that uses a hydrocarbon fuel, such as gasoline or light oil, to output power. A starter motor 26 is linked with the crankshaft 24 of the engine 22 via a belt 28 to generate electric power, which is to be supplied to auxiliary machines (not shown), and start the engine 22. An engine electronic control unit (hereafter referred to as engine ECU) takes charge of operation control of the engine 22, for example, fuel injection control, ignition control, and intake air flow regulation. The engine ECU 29 communicates with the hybrid ECU 70 to control operations of the engine 22 in response to control signals transmitted from the hybrid ECU 70 while outputting data relating to driving conditions of the engine 22 according to the requirements.

The planetary gear unit 30 has a sun gear 31 that is an external gear, a ring gear 32 that is an internal gear and is arranged concentrically with the sun gear 31, and a carrier 35 that holds a first pinion gear 33 engaging with the sun gear 31 and a second pinion gear 34 engaging with the first pinion gear 33 and the ring gear 32 in such a manner as to allow free revolution thereof and free rotation thereof on the respective axes. The planetary gear unit 30 allows for differential motions of the sun gear 31, the ring gear 32, and the carrier 35 as rotational elements. The crankshaft 24 of the engine 22 is coupled with the sun gear 31 of the planetary gear unit 30. A rotating shaft 41 of the motor 40 is coupled with the carrier 35 of the planetary gear unit 30. Output power is transmittable between the engine 22 and the motor 40 via the sun gear 31 and the carrier 35. The carrier 35 and the ring gear 32 are linked with an input shaft 51 of the CVT 50 respectively via a clutch C1 and a clutch C2. The clutch C1 and the clutch C2 in a coupling state prohibit differential motions of the three rotational elements, the sun gear 31, the ring gear 32, and the carrier 35 and cause the crankshaft 24 of the engine 22, the rotating shaft 41 of the motor 40, and the input shaft 51 of the CVT 50 to function as an integral rotating body. The planetary gear unit 30 also has a brake B1 that fixes the ring gear 32 to a casing 39 and prohibits rotation of the ring gear 32.

The motor 40 is a known synchronous motor generator, which is actuated both as a generator and as a motor, and transmits electric power to and from a secondary battery 44 via an inverter 43. The motor 40 is driven and controlled by a motor electronic control unit (hereafter referred to as motor ECU) 49. The motor ECU 49 receives input of various signals required for drive and control of the motor 40 and various signals required for management of the secondary battery 44, and outputs a switching control signal to the inverter 43. The input includes, for example, a signal from a rotational position detection sensor 45 that detects the rotational position of a rotor in the motor 40, a phase current applied to the motor 40, which is measured by a current sensor (not shown), an inter-terminal voltage measured by a voltage sensor 46 disposed between terminals of the secondary battery 44, a charge-discharge current measured by a current sensor 47 attached to a power line from the secondary battery 44, and a battery temperature measured by a temperature sensor 48 attached to the secondary battery 44. The motor ECU 49 calculates a state of charge (SOC) of the secondary battery 44, based on the accumulated charge-discharge current measured by the current sensor 47 and the inter-terminal voltage measured by the voltage sensor 46, for management of the secondary battery 44. The motor ECU 49 communicates with the hybrid ECU 70 to drive and control the motor 40 in response to control signals from the hybrid ECU 70 while outputting data relating to the driving conditions of the motor 40 and the state of the secondary battery 44 to the hybrid ECU 70.

The CVT 50 has a primary pulley 53 that has a variable groove width and is linked with the input shaft 51, a secondary pulley 54 that also has a variable groove width and is linked with an output shaft 52 as a drive shaft, a belt 55 that is spanned over the grooves of the primary pulley 53 and the secondary pulley 54, and a first actuator 56 and a second actuator 57 that vary the groove widths of the primary pulley 53 and the secondary pulley 54. The variation of the groove widths of the primary pulley 53 and the secondary pulley 54 by means of the first actuator 56 and the second actuator 57 results in changing the speed of a power from the input shaft 51 in a stepless manner. The stepless speed-changed power is output to the output shaft 52. A CVT electronic control unit (hereafter referred to as CVTECU) 59 regulates the change gear ratio set in the CVT 50. The CVTECU 59 receives a revolving speed Ni of the input shaft 51 measured by a revolving speed sensor 61 attached to the input shaft 51 and a revolving speed No of the output shaft 52 measured by a revolving speed sensor 62 attached to the output shaft 52, and outputs driving signals to the first actuator 56 and the second actuator 57. The CVTECU 59 communicates with the hybrid ECU 70 to regulate the change gear ratio set in the CVT 50 in response to control signals transmitted from the hybrid ECU 70, while outputting data relating to the driving conditions of the CVT 50 to the hybrid ECU 70 according to the requirements.

The hybrid ECU 70 is constructed as a microprocessor including a CPU 72, a ROM 74 that stores processing programs, a RAM 76 that temporarily stores data, and an input-output port and a communication port (not shown). The hybrid ECU 70 receives input of various data and instruction signals via the input port. The input includes, for example, the revolving speed Ni of the input shaft 51 transmitted from the revolving speed sensor 61, the revolving speed No of the output shaft 52 transmitted from the revolving speed sensor 62, a gearshift position SP transmitted from a gearshift position sensor 81 that detects the operating position of a gearshift lever 80, an accelerator opening A transmitted from an accelerator pedal position sensor 83 that measures the step-on amount of an accelerator pedal 82, a brake pedal position BP transmitted from a brake pedal position sensor 85 that measures the step-on amount of a brake pedal 84, and a vehicle speed V measured by a vehicle speed sensor 86. The input also includes instruction signals from a cruise control switch 88 that gives an activation command to actuate a cruise control system (constant speed drive) as well as instructions for diverse operations (for example, setting the vehicle speed, speed reduction control, speed-up control, restoration of control, and cancellation of control) in the working status of the cruise control system. The hybrid ECU 70 outputs driving signals to the clutches C1 and C2 and the brake B1 via the output port. The hybrid ECU 70 is connected with the engine ECU 29, the motor ECU 49, and the CVTECU 59 via the communication port to transmit data and various control signals to and from the engine ECU 29, the motor ECU 49, and the CVTECU 59, as mentioned previously.

Figure 2:
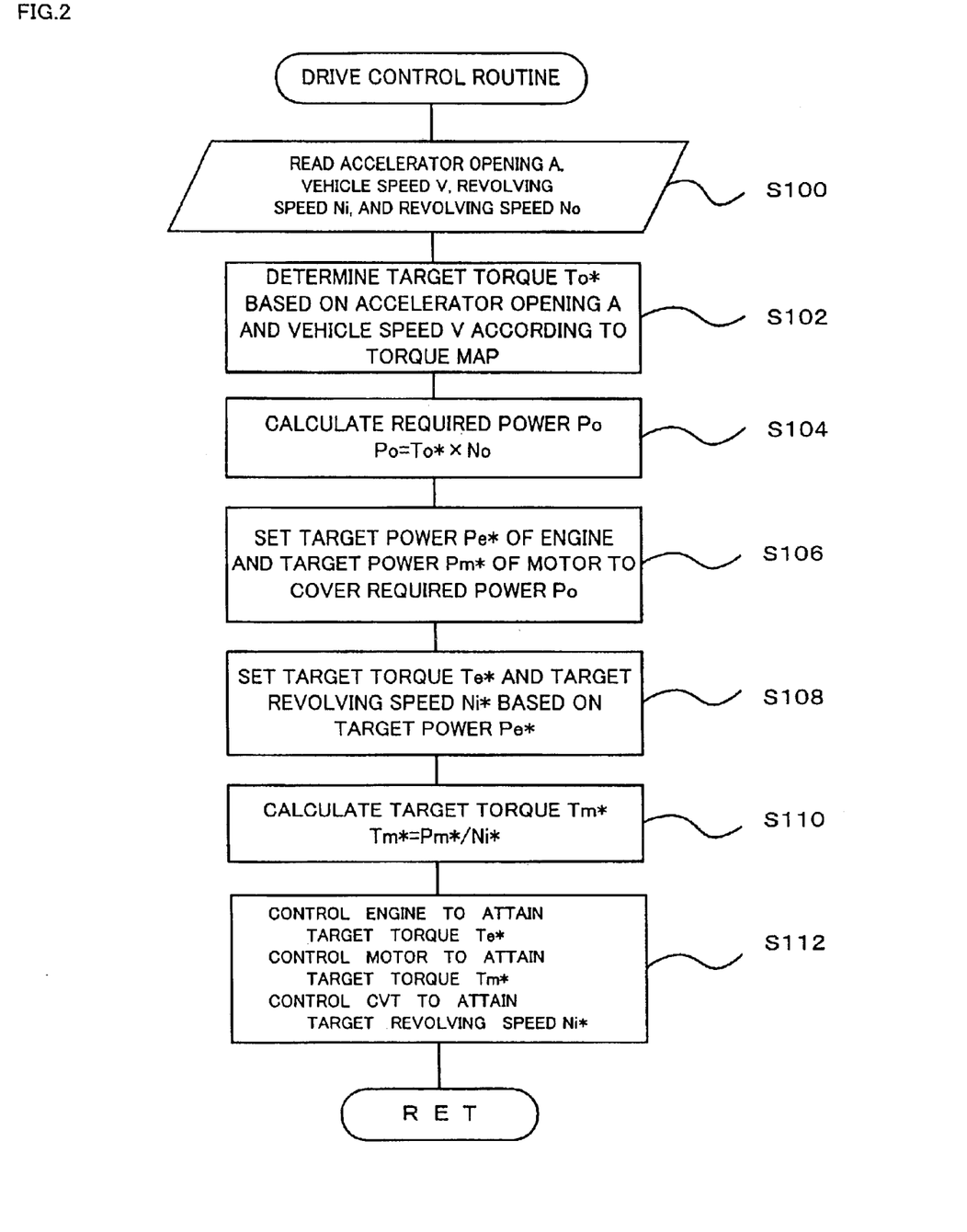
FIG. 2 is a flowchart showing a drive control routine executed by a hybrid ECU 70 in the power output apparatus 20 of the embodiment.

The following describes the operations of the power output apparatus 20 of the embodiment thus constructed, especially the operations of the power output apparatus 20 in the working status of the cruise control system. The description first regards the basic operations of the power output apparatus 20 in the non-working status of the cruise control system, and then the operations of the power output apparatus 20 in the working status of the cruise control system. FIG. 2 is a flowchart showing a drive control routine executed by the hybrid ECU 70 of the power output apparatus 20 in the non-working status of the cruise control system. This routine is repeatedly carried out at preset time intervals while the clutches C1 and C2 are in the coupled state and the brake B1 is in the released state, that is, while the crankshaft 24 of the engine 22, the rotating shaft 41 of the motor 40, and the input shaft 51 of the CVT 50 are rotated as an integral rotating body.

Figure 3:
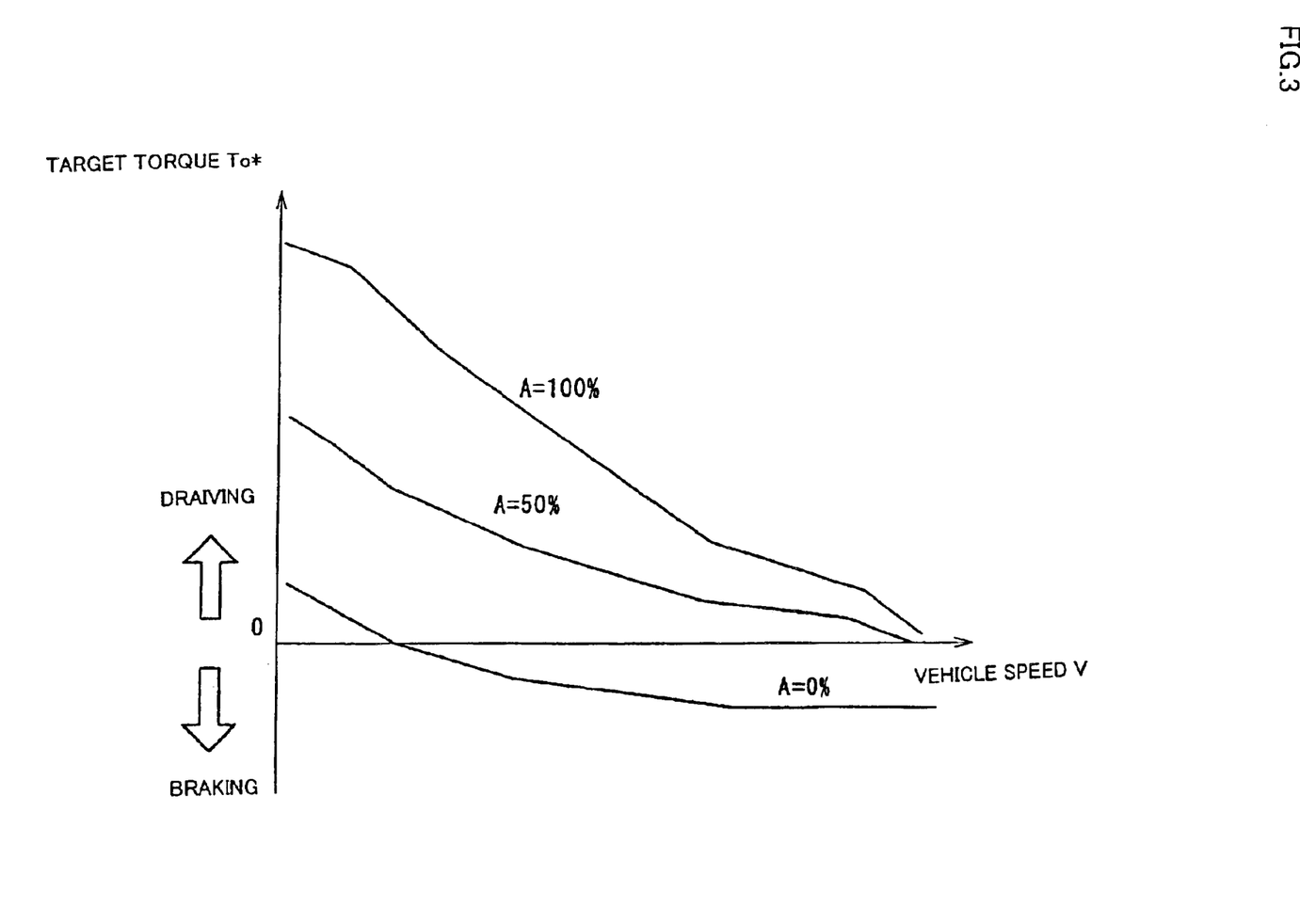
FIG. 3 is a map showing a relationship between accelerator opening A, vehicle speed V, and target torque To*.

When the program enters the drive control routine, the CPU 72 of the hybrid ECU 70 first receives the required signals for control, for example, the accelerator opening A from the accelerator pedal position sensor 83, the vehicle speed V from the vehicle speed sensor 86, the revolving speed Ni of the input shaft 51 from the revolving speed sensor 61, the revolving speed No of the output shaft 52 from the revolving speed sensor 62, and the state of charge (SOC) of the secondary battery 44 (step S100). The CPU 72 determines a target torque To* of the output shaft 52 functioning as the drive shaft, based on the input accelerator opening A and vehicle speed V (step S102). The procedure of this embodiment experimentally or otherwise specifies the relationship between the accelerator opening A, the vehicle speed V, and the target torque To* in advance and stores the relationship in the form of a torque map in the ROM 74. The target torque To* corresponding to the input accelerator opening A and vehicle speed V is read from the torque map. FIG. 3 shows a torque map showing the relationship between the accelerator opening A, the vehicle speed V, and the target torque To*.

After determination of the target torque To*, the CPU 72 multiplies the target torque To* by the revolving speed No of the output shaft 52 input at step S100 (or the revolving speed of the output shaft 52 calculated from the vehicle speed V based on a gear ratio of the differential gear 64) to calculate a power required for the output shaft 52 (required power Po) (step S104). The CPU 72 then sets a target power Pe* of the engine 22 and a target power Pm* of the motor 40 to cover the calculated required power Po (step S106). The target powers Pe* and Pm* are set based on the magnitude of the required power Po and the state of charge (SOC) of the secondary battery 44, in order to satisfy an equation of Po=Pe*+Pm*.

After setting the target power Pe*, the CPU 72 sets a target torque Te* of the engine 22, which ensures efficient drive of the engine 22, and a target revolving speed Ni* of the input shaft 51, based on the setting of the target power Pe* (step S108). The CPU 72 divides the target power Pm* by the target revolving speed Ni* to calculate a target torque Tm* of the motor 40 (step S110), and controls the engine 22 to attain the target torque Te*, the motor 40 to attain the target torque Tm*, and the CVT 50 to rotate the input shaft 51 at the target revolving speed Ni* (step S112). The program then exits from this routine. According to the concrete procedure of controlling the engine 22, the motor 40, and the CVT 50, the hybrid ECU 70 outputs the target torque Te*, the target torque Tm*, and the target revolving speed Ni* as control signals respectively to the engine ECU 29, the motor ECU 49, and the CVTECU 59. The engine ECU 29 controls the engine 22 to output a torque equal to the target torque Te*. The motor ECU 49 controls the motor 40 to output a torque equal to the target torque Tm*. The CVTECU 59 controls the CVT 50 to rotate the input shaft 51 at the target revolving speed Ni*.

Figure 4:
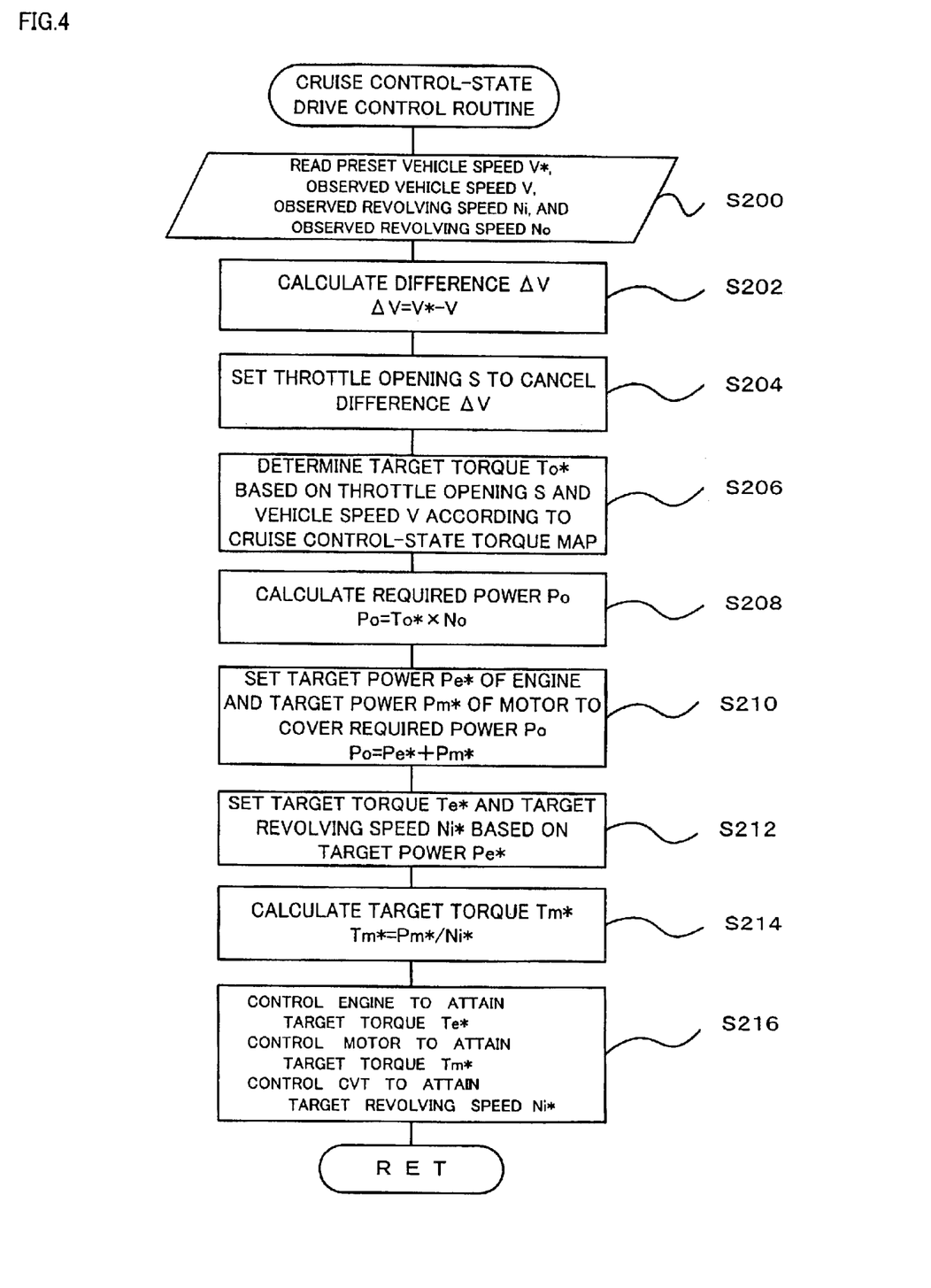
FIG. 4 is a flowchart showing a cruise control-state drive control routine executed by the hybrid ECU 70 in the power output apparatus 20 of the embodiment.

This is the basic operations of the power output apparatus 20 in the non-working status of the cruise control system. The operations of the power output apparatus 20 of the embodiment in the working status of the cruise control system are discussed below. FIG. 4 is a flowchart showing a cruise control-state drive control routine executed by the hybrid ECU 70 in the power output apparatus 20 of the embodiment. This routine is repeatedly carried out at preset time intervals in response to a driver's operation of the cruise control switch 88 to set the cruise control system in the working status, while the clutches C1 and C2 are in the coupled state, the brake B1 is in the released state, and the vehicle speed is within a predetermined range.

Figure 5:
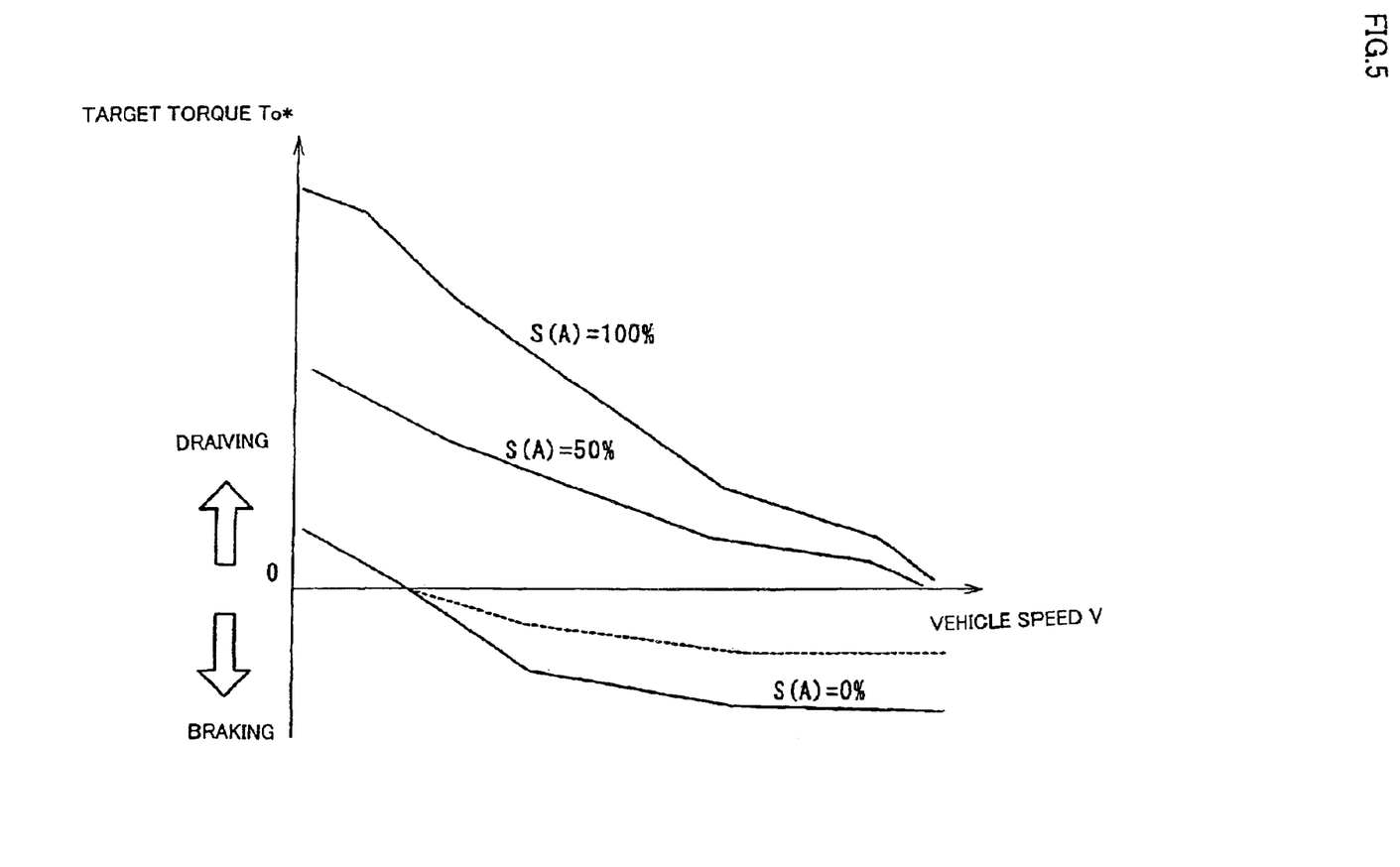
FIG. 5 is a map showing a relationship between throttle opening S (accelerator opening A), vehicle speed V, and target torque To*.

When the program enters the cruise control-state drive control routine, the CPU 72 of the hybrid ECU 70 first reads required signals for control, for example, a preset vehicle speed V* set by the driver's operation of the cruise control switch 88, the observed vehicle speed V from the vehicle speed sensor 86, and observed the revolving speeds Ni and No from the revolving speed sensors 61 and 62 (step S200). The CPU 72 then calculates a difference ΔV (=V*−V) between the preset vehicle speed V* and the observed vehicle speed V (step S202), sets a throttle opening S, which corresponds to the accelerator opening A, to cancel the difference ΔV (step S204), and determines a target torque To* of the output shaft 52 based on the throttle opening S (accelerator opening A) and the vehicle speed V according to a cruise control-state torque map (step S206). The determination of the target torque To* follows a similar procedure to that of the processing at step S102 in the routine of FIG. 2. The throttle opening S is one-to-one mapped to the accelerator opening A. The procedure experimentally or otherwise specifies a relationship between the throttle opening S, the vehicle speed V, and the target torque To* in advance and stores the relationship in the form of a cruise control-state torque map in the ROM 74. The target torque To* corresponding to the input throttle opening S and vehicle speed V is read from the cruise control-state torque map. FIG. 5 shows a cruise control-state torque map showing the relationship between the throttle opening S (accelerator opening A), the vehicle speed V, and the target torque To*.

At vehicle speeds of not lower than a specific vehicle speed making a creep torque equal to zero, the braking force in a throttle valve OFF position in the map for the cruise control-state drive control routine (shown by the solid line in FIG. 5) is set greater than the braking force in an accelerator OFF position (throttle valve OFF position) in the map for the drive control routine in FIG. 2 (shown by the broken line in FIG. 5). The range of a braking torque possibly output to the output shaft 52 in the working status of the cruise control system is set wider than the range of a braking torque possibly output to the output shaft 52 through an operation of the accelerator pedal in the non-working status of the cruise control system. This allows for output of a braking torque corresponding to a relatively large load in the driving direction applied to the output shaft 52. For example, when the vehicle in the working status of the cruise control system runs on a downslope having a preset or greater gradient (for example, a gradient of −10%), the braking force corresponding to the load in the driving direction applied to the output shaft 52 due to the downslope may not be output to the output shaft 52 and cause the vehicle to be accelerated over the preset vehicle speed. In such cases, the driver should step on the brake pedal to reduce the speed of the vehicle. Output of the braking force corresponding to the load in the driving direction applied to the output shaft 52 due to the downslope effectively prevents the vehicle from being accelerated to have the vehicle speed V exceeding the preset vehicle speed V* and keeps the vehicle speed V at the level of the preset vehicle speed V*.

After determination of the target torque To* of the output shaft 52, the CPU 72 multiplies the target torque To* by the revolving speed No to calculate a required power Po for the output shaft 52 (step S208). The required power Po of a positive value functions as a driving power, while the required power Po of a negative value functions as a braking power. The CPU 72 then sets the target power Pe* of the engine 22 and the target power Pm* of the motor 40 to make the output of the engine 22 and the output of the motor 40 cover the calculated required power Po (step S210). The procedure of the embodiment sets the target powers Pe* and Pm* to satisfy an equation of Po=Pe*+Pm*. The settings of the target powers Pe* and Pm* may have any ratio. When the braking power is required as the target power Po, the engine 22 utilizes a friction torque produced by the downshift control of the change gear ratio in the CVT 50 to output the braking power, while the motor 40 utilizes the regenerative torque to output the braking power. Setting a greater share ratio of the motor 40 effectively ensures recovery of the braking energy and enhances the energy efficiency of the whole apparatus.

After setting the target power Pe* of the engine 22, the CPU 72 calculates a target torque Te* of the engine 22 from the target power Pe* and sets the revolving speed of the input shaft 51 to a target revolving speed Ni* to attain the target power Pe* (step S212). The CPU 72 divides the target power Pm* by the target revolving speed Ni* to calculate a target torque Tm* of the motor 40 (step S214), and controls the engine 22 to attain the target torque Te*, the motor 40 to attain the target torque Tm*, and the CVT 50 to rotate the input shaft 51 at the target revolving speed Ni* (step S216). The program then exits from this routine.

In the power output apparatus 20 of the embodiment, the range of the braking force possibly output to the output shaft 52 in the working status of the cruise control system is set to be greater than the range of the braking force possibly output to the output shaft 52 by the accelerator opening A in the non-working status of the cruise control system. Even when a relatively large driving load is applied to the output shaft 52 in the working status of the cruise control system, this arrangement enables a sufficiently large braking force comparable to the relatively large driving load to be output to the output shaft 52. Under the control of the cruise control system, the vehicle speed is thus desirably kept at the driver's preset vehicle speed V*. The power output apparatus 20 of the embodiment carries out the downshift control of the CVT 50 functioning as the continuously variable transmission to continuously regulate the friction torque output from the engine 22 to the output shaft 52. Such continuous regulation effectively prevents an abrupt change of the revolving speed Ni of the input shaft 51 while outputting the braking force to the output shaft 52, thus ensuring the favorable drivability.

As discussed above, in the power output apparatus 20 of the embodiment, the range of the braking force possibly output to the output shaft 52 in the working status of the cruise control system is set to be greater than the range of the braking force possibly output to the output shaft 52 by the accelerator opening A in the non-working status of the cruise control system. Additionally the range of the driving force possibly output to the output shaft 52 in the working status of the cruise control system may be set to be greater than the range of the driving force possibly output to the output shaft 52 by the accelerator opening A in the non-working status of the cruise control system.

The power output apparatus 20 of the embodiment outputs the braking force to the drive shaft as the combination of the friction torque of the engine 22 caused by the downshift control of the change gear ratio in the CVT 50 with the regenerative torque caused by the regenerative control of the motor 40. One possible modification may utilize either one of the downshift control and the regenerative control to output the braking force to the drive shaft.

The power output apparatus 20 of the embodiment has the CVT 50 working as the continuously variable transmission. The transmission is, however, not restricted to the continuously variable transmission but may be a stepped speed gear.

The power output apparatus 20 is applied to the hybrid vehicle in the embodiment discussed above. The application is, however, not restricted to the hybrid vehicle. The principle of the invention is applicable to any of various automobiles with an internal combustion engine that outputs the power to a drive shaft via a transmission, any of electric vehicles with a motor generator that transmits the power to and from a drive shaft, and other moving bodies like boats, ships, and aircraft. The automobile with the transmission and the internal combustion engine utilizes the rotational resistance of the internal combustion engine caused by the downshift control of the transmission to output the required braking force to the drive shaft. The electric vehicle with the motor generator utilizes the braking force caused by the regenerative control of the motor generator to output the required braking force to the drive shaft.

The above embodiments are to be considered in all aspects as illustrative and not restrictive. There may be many modifications, change, and alterations without departing from the scope or sprit of the main characteristics of the present invention. All changes within the meaning and range of equivalency of the claims are therefore intended to be embraced therein.

What is claimed is:

1. A power output apparatus, comprising:
   a power output unit that outputs power to a drive shaft;
   a switch that sets a target revolving speed of the drive shaft; and
   a controller that applies a first map, which is used to set a predetermined power output range, when said switch has not been operated to set the target revolving speed, and drives and controls said power output unit to output a power corresponding to an accelerator opening to the drive shaft, while applying a second map, which is used to set a wider power output range than the predetermined power output range, in response to said switch being operated to set the target revolving speed, and driving and controlling said power output unit to keep a revolving speed of the drive shaft at the target revolving speed.

2. A power output apparatus in accordance with claim 1, wherein the second map is used to set a greater braking force than a braking force to be output to the drive shaft, which is set by the first map, in a full closed position of the accelerator opening.

3. A power output apparatus in accordance with claim 2, wherein said power output unit comprises an internal combustion engine that functions as a power source, and a transmission that changes speed of a power from the internal combustion engine and outputs the speed-changed power to the drive shaft, and
   said controller utilizes a rotational resistance of the internal combustion engine due to regulation of a change gear ratio set in the transmission, so as to enable the greater braking force to be output to the drive shaft.

4. A power output apparatus in accordance with claim 3, wherein the transmission is a continuously variable transmission.

5. A power output apparatus in accordance with claim 2, wherein said power output unit comprises a motor that functions as a power source to output a power to the drive shaft and generates electric power in response to input of a power from the drive shaft, and
   said controller utilizes a braking force due to regenerative control of the motor, so as to enable the greater braking force to be output to the drive shaft.

6. A movable body, comprising:
   a power output unit that outputs power to a drive shaft;
   a switch that sets a target traveling speed; and
   a controller that applies a first map, which is used to set a predetermined power output range, when said switch has not been operated to set the target traveling speed, and drives and controls said power output unit to output a power corresponding to an accelerator opening to the drive shaft, while applying a second map, which is used to set a wider power output range than the predetermined power output range, in response to said switch being operated to set the target traveling speed, and driving and controlling said power output unit to keep a traveling speed of the drive shaft at the target traveling speed.

7. A movable body in accordance with claim 6, wherein the second map is used to set a greater braking force than a braking force to be output to the drive shaft, which is set by the first map, in a full closed position of the accelerator opening.

8. A movable body in accordance with claim 7, wherein said power output unit comprises an internal combustion engine that functions as a power source, and a transmission that changes speed of a power from the internal combustion engine and outputs the speed-changed power to the drive shaft, and
   said controller utilizes a rotational resistance of the internal combustion engine due to regulation of a change gear ratio set in the transmission, so as to enable the greater braking force to be output to the drive shaft.

9. A movable body in accordance with claim 8, wherein the transmission is a continuously variable transmission.

10. A movable body in accordance with claim 6, wherein said power output unit comprises a motor that functions as a power source to output a power to the drive shaft and generates electric power in response to input of a power from the drive shaft, and
    said controller utilizes a braking force due to regenerative control of the motor, so as to enable the greater braking force to be output to the drive shaft.

11. A movable body in accordance with claim 6, wherein said movable body is a vehicle.

12. A method of controlling a power output unit that outputs power to a drive shaft, said method applying a first map, which is used to set a predetermined power output range, when a target revolving speed of the drive shaft is not set, and driving and controlling said power output unit to output a power corresponding to an accelerator opening to the drive shaft, while applying a second map, which is used to set a wider power output range than the predetermined power output range, in response to setting of the target revolving speed of the drive shaft, and driving and controlling said power output unit to keep a revolving speed of the drive shaft at the target revolving speed.

13. A method in accordance with claim 12, wherein the second map is used to set a greater braking force than a braking force to be output to the drive shaft, which is set by the first map, in a full closed position of the accelerator opening.

* * * * *